United States Patent [19]

Archer

[11] 4,307,567
[45] Dec. 29, 1981

[54] CHAIN SHACKLES

[75] Inventor: Jean F. Archer, Villennes, France

[73] Assignee: STAS Societe Technique d'Accessoires Specialises, Sartrouville, France

[21] Appl. No.: 92,184

[22] Filed: Nov. 7, 1979

[30] Foreign Application Priority Data

Nov. 10, 1978 [FR] France .................................. 78 32587

[51] Int. Cl.³ ............................................ F16G 15/06
[52] U.S. Cl. ............................................ 59/86; 59/93
[58] Field of Search .................. 59/86, 83, 91, 78, 85, 59/93; 119/128; 17/44; 72/472; 70/18, 53; 403/324; 24/201 L

[56] References Cited

U.S. PATENT DOCUMENTS 550,417  11/1895  Miller ..................................... 59/86
1,561,787  11/1925  Jones ..................................... 59/86
4,137,704  2/1979  Schreyer ................................ 59/86

Primary Examiner—Mark Rosenbaum
Attorney, Agent, or Firm—Karl F. Ross

[57] ABSTRACT

A chain shackle has a U-shaped body with flat parallel limbs interconnected by a bight portion with a longitudinal slit accommodating an end link of a chain which is engaged inside the shackle by a half-link resting against the inner surface of the bight portion. The half-link has an integral lug which is traversed by a pin laterally offset from the slit serving to hold that half-link in a chain-retaining position.

5 Claims, 2 Drawing Figures

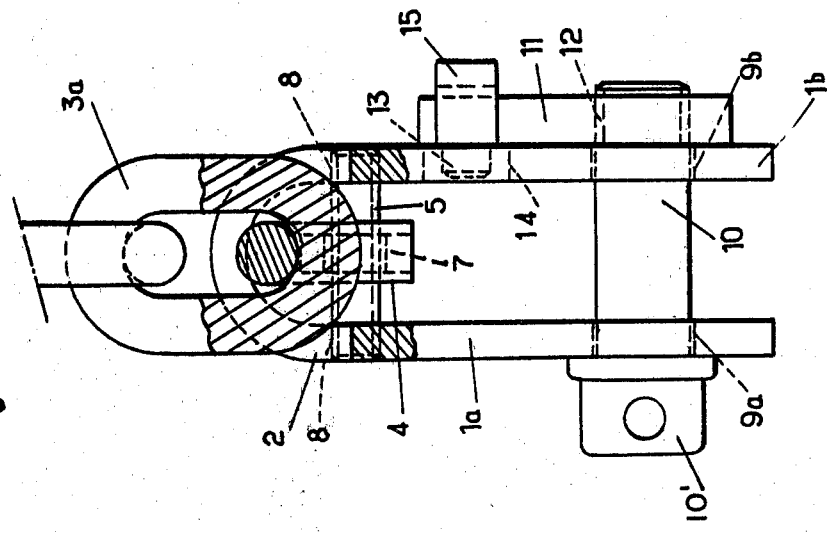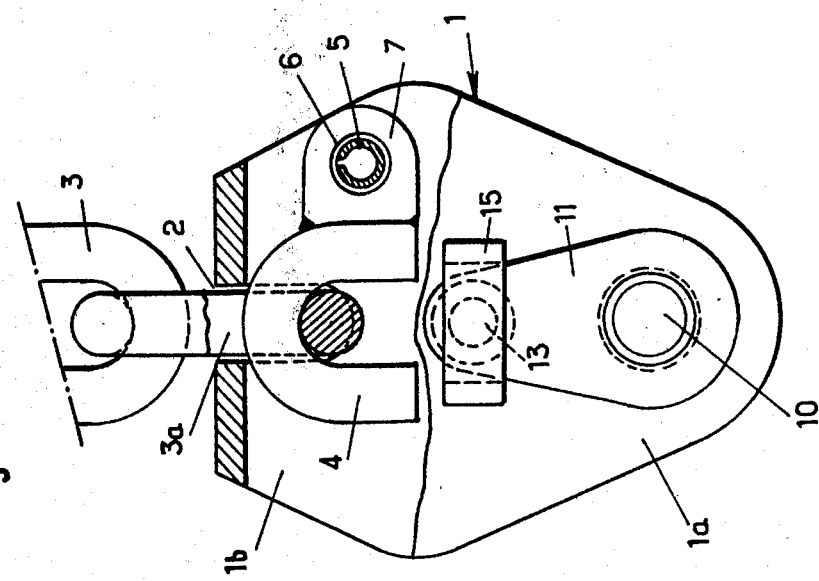

CHAIN SHACKLES

FIELD OF THE INVENTION

The present invention relates to chain shackles.

BACKGROUND OF THE INVENTION

The joining of a shackle to a chain poses a problem that has proved difficult to solve satisfactorily. It is impossible to insert the body of a standard shackle into the end link of the chain unless a small shackle is used whose strength is clearly lower than that of the chain. If, conversely, a shackle pin is inserted into the end link of the chain, that pin may have a diameter substantially equal to that of the links of the chain. But a pin, being rectilinear, operates under less favorable conditions than a chain link and, in order to exhibit the same strength as a link, would have to have a diameter greater than that of the link. In both cases, the shackle is a weak point in the chain and prevents the chain from being used with loads which it could otherwise carry.

OBJECT OF THE INVENTION

The object of my present invention is to provide a chain shackle having a strength of the same order of magnitude as that of the chain on which it is mounted.

SUMMARY OF THE INVENTION

I realize this object, in accordance with my present invention, by the provision of a generally U-shaped unitary body with substantially parallel limbs interconnected by a substantially semicylindrically curved bight portion which is bisected by a slit in a longitudinal plane of symmetry perpendicular to its axis of curvature. A retaining member inside the U-shaped shackle body has the form of one half of a generally O-shaped chain link of round cross-section with a diameter substantially equaling the width of the slit, this member being disposed close to the bight portion of that body between the limbs thereof for engagement with a generally O-shaped end link of a chain traversing the slit. The retaining member is kept in a link-engaging position by removable holding means coupled to that member and to the limbs of the body, specifically a pin seated in a pair of aligned holes in these limbs while traversing an extension of the retaining member. This extension may be a lug parallel to the body limbs; the holding pin passes through that lug at a location laterally offset from the slit and thus from the plane of symmetry of the shackle body so as not to be subjected to any significant stresses from the chain, these stresses being absorbed by the bight portion of the body against which the retaining member comes to rest from within.

BRIEF DESCRIPTION OF THE DRAWING

An embodiment of the invention will now be described, by way of example only, with reference to the accompanying drawing in which:

FIG. 1 is an end elevation, partly in section, of a shackle in accordance with the invention; and FIG. 2 is a side elevation, partly in section, of the shackle shown in FIG. 1.

SPECIFIC DESCRIPTION

As shown in the drawing, a shackle 1 is formed from a plate bent into U-shape which has a longitudinal slit 2 in its bight portion and to forms a shackle body having flat parallel limbs 1a and 1b, the slit 2 lying in a longitudinal plane of symmetry bisecting these links.

The slit 2 has a width slightly in excess of the thickness of the O-shaped links of a chain 3 to permit insertion of the end link 3a of the chain 3 when that link lies in the aforementioned plane of symmetry perpendicular to the limbs 1a and 1b. A retaining half-link 4 of rounded cross-section, having the same diameter as the links of the chain 3 or a slightly great diameter, is interposed between the two limbs 1a and 1b of the shackle and is hooked into the link 3a while resting against the slitted bight portion. The retaining half-link 4 can be secured to the shackle body by a split tubular holding pin 5 passing through a hole 6 in a lug 7 integral with the half-link and through opposite holes 8 in the limbs 1a and 1b.

To fix the shackle 1 to the chain 3, the link 3a is inserted into the slit 2 whereupon the half-link 4 is hooked into the link 3a and is then attached to the shackle body by means of the pin 5.

In the embodiment shown, each of the limbs 1a and 1b of the shackle is perforated at a free end thereof with a smooth hole 9a or 9b, respectively, through which a bolt 10 passes. A pear-shaped nut 11 is perforated in its wider portion by a threaded hole 12 into which the pin 10 is screwed. The nut 11, lying on the outer surface of limb 1b, has a stud 13 projecting from the internal face of the latter. This stud is received with relatively substantial play in a hole 14 in the limb 1b. A clip 15 is welded onto the external face of the limb 1b, in line with the hole 14, the narrower end of the washer 11 being bracketed by the clip 15 which thus holds the washer and prevents its detachment from the shackle body.

When the bolt 10 is inserted into the holes 9a and 9b and screwed into the threaded hole 12 of the nut 11, the latter comes to rest on the limb 1b while the other limb 1a is engaged by a head 10' of that bolt.

The pin 5, which is laterally offset from slit 2, is not loaded by the chain 3 and merely holds the member 4 in its illustrated retaining position. Removal of the pin 5 will therefore allow this member to be disengaged from end link 3a.

What is claimed is:

1. A chain shackle comprising:
    a generally U-shaped unitary body with substantially parallel limbs interconnected by a substantially semicylindrically curved bight portion bisected by a slit in a longitudinal plane of symmetry perpendicular to its axis of curvature;
    a retaining member in the form of one half of a generally O-shaped chain link of round cross-section with a diameter substantially equaling the width of said slit, said retaining member being disposed between said limbs close to said bight portion for engagement with a generally O-shaped end link of a chain traversing said slit; and
    removable holding means coupled to said limbs and to said retaining member for keeping the latter in a link-engaging position.

2. A chain shackle as defined in claim 1 wherein said holding means comprises a pin seated in a pair of aligned holes in said limbs, said retaining member being provided with an extension traversed by said pin.

3. A chain shackle as defined in claim 2, wherein said extension is a lug parallel to said limbs traversed by said pin at a location laterally offset from said slit.

4. A chain shackle as defined in claim 1, 2 or 3 wherein said limbs have free ends interconnected by a removable bolt remote from said holding means.

5. A chain shackle as defined in claim 4 wherein said bolt has a head bearing upon one of said limbs, a threaded end of said bolt remote from said head being engaged by a nut bearing upon the other of said limbs.

* * * * *